(12) United States Patent
Gronenborn et al.

(10) Patent No.: US 12,494,621 B2
(45) Date of Patent: Dec. 9, 2025

(54) VERTICAL CAVITY SURFACE EMITTING LASER (VCSEL) BASED PATTERN PROJECTOR

(71) Applicant: TRUMPF Photonic Components GmbH, Ulm (DE)

(72) Inventors: Stephan Gronenborn, Aachen (DE); Holger Joachim Moench, Vaals (NL)

(73) Assignee: TRUMPF PHOTONIC COMPONENTS GMBH, Ulm (DE)

(*) Notice: Subject to any disclaimer, the term of this patent is extended or adjusted under 35 U.S.C. 154(b) by 1042 days.

(21) Appl. No.: 17/540,294

(22) Filed: Dec. 2, 2021

(65) Prior Publication Data

US 2022/0123530 A1 Apr. 21, 2022

Related U.S. Application Data

(63) Continuation of application No. PCT/EP2020/065684, filed on Jun. 5, 2020.

(30) Foreign Application Priority Data

Jun. 6, 2019 (EP) ..................... 19178757

(51) Int. Cl.
*H01S 5/42* (2006.01)
*G02B 27/09* (2006.01)
*H01S 5/00* (2006.01)

(52) U.S. Cl.
CPC .......... *H01S 5/423* (2013.01); *G02B 27/0961* (2013.01); *H01S 5/005* (2013.01)

(58) Field of Classification Search
CPC ..... H01S 5/423; H01S 5/005; G02B 27/0961; G01B 11/2513
See application file for complete search history.

(56) References Cited

U.S. PATENT DOCUMENTS

| 9,048,633 B2 | 6/2015 | Gronenborn et al. |
| 10,019,897 B2 | 7/2018 | Pekarski et al. |
| (Continued) | | |

FOREIGN PATENT DOCUMENTS

| CN | 104471348 A | 3/2015 |
| CN | 105829113 A | 8/2016 |
| (Continued) | | |

*Primary Examiner* — Yuanda Zhang
(74) *Attorney, Agent, or Firm* — LEYDIG VOIT & MAYER LTD.

(57) ABSTRACT

An optoelectronic apparatus is adapted to generate a structured light pattern. The optoelectronic apparatus has: a first array of vertical cavity surface emitting lasers (VCSELs); a first homogenization optics arrangement associated with the first array of VCSELs; a second array of VCSELs; a second homogenization optics arrangement associated with the second array of VCSELs; and a pattern optics arrangement configured to generate a structured light pattern based on a common homogeneous intensity distribution in an intermediate plane. The first homogenization optics arrangement and the second homogenization, each associated with a different one of the first array of VCSELs or the second array of VCSELs, are arranged such that their intensity distributions add up to the common homogeneous top-hat intensity distribution in the intermediate plane.

17 Claims, 6 Drawing Sheets

(56) References Cited

U.S. PATENT DOCUMENTS

| | | |
|---|---|---|
| 10,518,555 B2 | 12/2019 | Conrads et al. |
| 2011/0157706 A1* | 6/2011 | Mitra ................. G02B 27/0927 359/639 |
| 2012/0281293 A1 | 11/2012 | Gronenborn et al. |
| 2013/0038941 A1 | 2/2013 | Pesach et al. |
| 2013/0250066 A1 | 9/2013 | Abraham |
| 2015/0260830 A1 | 9/2015 | Ghosh et al. |
| 2016/0286202 A1* | 9/2016 | Romano ............. H04N 13/207 |
| 2017/0115497 A1 | 4/2017 | Chen et al. |
| 2017/0222404 A1 | 8/2017 | Atiya et al. |
| 2018/0292663 A1* | 10/2018 | Richards ............ G02B 27/0961 |

FOREIGN PATENT DOCUMENTS

| | | |
|---|---|---|
| EP | 2478602 A2 | 7/2012 |
| JP | 2018534592 A | 11/2018 |
| KR | 20120053045 A | 5/2012 |
| WO | WO 2011021140 A2 | 2/2011 |

* cited by examiner

VERTICAL CAVITY SURFACE EMITTING LASER (VCSEL) BASED PATTERN PROJECTOR

CROSS REFERENCE TO RELATED APPLICATIONS

This application is a continuation of International Application No. PCT/EP2020/065684 (WO 2020/245397), filed on Jun. 5, 2020, and claims benefit to European Patent Application No. EP 19178757.1, filed on Jun. 6, 2019. The aforementioned applications are hereby incorporated by reference herein.

FIELD

The present invention relates to optoelectronic devices. In particular, the present invention relates to an optoelectronic apparatus and system adapted to generate a structured light pattern. The present invention further relates to a corresponding method.

BACKGROUND

Miniature optical projectors are used in a variety of applications. For example, such projectors may be used to cast a pattern of coded or structured light onto an object for purposes of three-dimensional (3D) mapping (also known as depth mapping or depth sensing). Application scenarios may range from automotive sensors over measuring applications to features such as unlocking a smartphone via a depth scan of the user's face.

Time-of-flight (TOF) or light detection and ranging (LI-DAR) systems may benefit from using a spot pattern rather than a flood illuminator for a better signal-to-noise ratio. For example, in order to achieve a high spatial resolution, a system may need a pattern of more than 10,000 spots imaged onto the scene to be measured with each spot being operated at pulses in the nanosecond range at preferably high peak powers to be capable of operating in sunlight conditions and to achieve a sufficiently high signal-to-noise ratio on the detector.

A pattern can be generated by providing a structured light source having a plurality of light emitting elements that are arranged in a predetermined pattern. The light sources having the predetermined pattern can be projected onto the target by means of a projection lens. Optionally, multiple replicas of said predetermined pattern may be provided by means of a diffractive optical element (DOE).

US 2013/038941 A1 discloses a lens array projector. The optical apparatus includes a matrix of light sources arranged on a substrate with a predetermined, uniform spacing between the light sources. A beam homogenizer includes a first optical surface, including a first microlens array, which has a first pitch equal to the spacing between the light sources and which is aligned with the matrix so that a respective optical axis of each microlens in the array intercepts a corresponding light source in the matrix and transmits light emitted by the corresponding light source. A second optical surface, including a second microlens array, is positioned to receive and focus the light transmitted by the first microlens array and has a second pitch that is different from the first pitch.

US 2017/222404 A1 discloses a VCSEL based low coherence emitter for confocal 3d scanner. The methods and apparatus for measuring objects comprise a plurality of light sources to generate a plurality of light beams directed toward a spot generator array comprising a plurality of spot generating lenses. The plurality of light sources is separated from the spot generator array with a separation distance sufficient to overlap the plurality of light beams at each of the spot generating lenses. The overlap of each of the beams at each of the spot generating lenses provides smoothing of the energy profile of the light energy incident on the spot generating lenses. The spot generator array generates focused spots comprising overlapping focused beams. The overlapping beams may comprise overlapping beams of a vertical cavity surface emitting laser (VCSEL) array, and the overlapping focused beams can decrease optical artifacts.

SUMMARY

In an embodiment, the present disclosure provides an optoelectronic apparatus that is adapted to generate a structured light pattern. The optoelectronic apparatus has: a first array of vertical cavity surface emitting lasers (VCSELs); a first homogenization optics arrangement associated with the first array of VCSELs; a second array of VCSELs; a second homogenization optics arrangement associated with the second array of VCSELs; and a pattern optics arrangement configured to generate a structured light pattern based on a common homogeneous intensity distribution in an intermediate plane. The first homogenization optics arrangement and the second homogenization, each associated with a different one of the first array of VCSELs or the second array of VCSELs, are arranged such that their intensity distributions add up to the common homogeneous top-hat intensity distribution in the intermediate plane.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Aspects of the present invention provide an optoelectronic apparatus adapted to generate a structured light pattern. Aspects of the present invention advantageously provide an optoelectronic apparatus adapted to generate a structured light pattern having increased reliability over the state of the art. Further, aspects of the present invention advantageously provide a more flexible and/or more economical optoelectronic apparatus adapted to generate a structured light pattern.

According to a first aspect of the present disclosure, an optoelectronic apparatus adapted to generate a structured light pattern is presented. The optoelectronic apparatus comprises an array of vertical cavity surface emitting lasers, VCSELs; a homogenization optics arrangement associated with the first array of vertical cavity surface emitting lasers. The optoelectronic apparatus can further comprise a second array of vertical cavity surface emitting lasers, VCSELs; and a second homogenization optics arrangement associated with the second array of vertical cavity surface emitting lasers. The homogenization optics arrangements, each associated with a different VCSEL array, can be arranged such that their intensity distributions add up to a common homogeneous top-hat intensity distribution in an intermediate plane. The optoelectronic apparatus further comprises a pattern optics arrangement adapted to generate a structured light pattern based on the common homogeneous intensity distribution in the intermediate plane.

According to a further aspect of the present disclosure, an optoelectronic apparatus adapted to generate a structured light pattern is presented. The optoelectronic apparatus comprises an array of vertical cavity surface emitting lasers, VCSELs; a homogenization optics arrangement adapted to provide, based on light emitted by a plurality of VCSELs of the array of VCSELs, a homogeneous intensity distribution in an intermediate plane; and a pattern optics arrangement adapted to generate a structured light pattern based on the homogeneous intensity distribution in the intermediate plane. The apparatus can further comprise a second array of vertical cavity surface emitting lasers, VCSELs; a second homogenization optics arrangement adapted to provide, based on light emitted by a plurality of VCSELs of the second array of VCSELs, a second homogeneous intensity distribution in an intermediate plane; and a second pattern optics arrangement adapted to generate a second structured light pattern based on the second homogeneous intensity distribution in the intermediate plane. The homogenization optics arrangement can be adapted to provide a first top-hat intensity distribution in the intermediate plane based on light emitted by a plurality of VCSELs of the VCSEL array. The second homogenization optics arrangement can be adapted to provide a second top-hat intensity distribution in the intermediate plane based on light emitted by a plurality of VCSELs of the second VCSEL array, such that the first top-hat intensity distribution and the second top-hat intensity distribution are adjacent to each other and together form a combined top-hat intensity distribution providing a homogeneous intensity distribution in the intermediate plane.

In a further aspect of the present disclosure, a system adapted to generate a structured light pattern is presented, the system comprising one of the aforementioned apparatuses; and a controller adapted to control or drive the VCSELs of the VCSEL array.

In yet a further aspect of the present disclosure, a method for generating a structured light pattern is presented, the method comprising the steps of providing a first array of vertical cavity surface emitting lasers, VCSELs; providing a first homogenization optics arrangement associated with the first array of vertical cavity surface emitting lasers; providing a second array of vertical cavity surface emitting lasers, VCSELs; providing a second homogenization optics arrangement associated with the second array of vertical cavity surface emitting lasers; wherein the homogenization optics arrangements, each associated with a different VCSEL array, are arranged such that their intensity distributions add up to a common homogeneous top-hat intensity distribution in an intermediate plane; and generating a structured light pattern based on the common homogeneous intensity distribution in the intermediate plane.

In yet a further aspect of the present disclosure, a method for generating a structured light pattern is presented, the method comprising the steps of providing an array of vertical cavity surface emitting lasers, VCSELs; homogenizing, in an intermediate plane, light emitted by a plurality of VCSELs of the array of VCSELs to provide a homogeneous intensity distribution in the intermediate plane; and generating a structured light pattern based on the homogeneous intensity distribution in the intermediate plane. The method can further comprise providing a second array of vertical cavity surface emitting lasers, VCSELs; homogenizing, in the intermediate plane, light emitted by a plurality of VCSELs of the second array of VCSELs to provide a second homogeneous intensity distribution in the intermediate plane; and generating a second structured light pattern based on the second homogeneous intensity distribution in the intermediate plane. The homogenizing can comprise providing a first top-hat intensity distribution in the intermediate plane based on light emitted by a plurality of VCSELs of the VCSEL array and providing a second top-hat intensity distribution in the intermediate plane based on light emitted by a plurality of VCSELs of the second VCSEL array, such that the first top-hat intensity distribution and the second top-hat intensity distribution are adjacent to each other and together form a combined top-hat intensity distribution providing a homogeneous intensity distribution in the intermediate plane.

The herein presented embodiments may provide a possibility to further increase the reliability of an optoelectronic apparatus adapted to generate a structured light pattern. The presented embodiments may provide a more flexible and/or more economical optoelectronic apparatus adapted to generate a structured light pattern.

One or more embodiments of the present invention is based, inter alia, on the idea to decouple the chip design from the required spot pattern. Instead of imaging a predetermined pattern of VCSELs on a chip and potentially replicating said predetermined pattern multiple times by means of a diffractive optical element, it is suggested to generate, based on light emitted by a plurality of VCSELs of the VCSEL array, a homogeneous intensity distribution in an intermediate plane. Hence, even though a (first) pattern of VCSELs in a VCSEL array is provided, said VCSEL pattern provided by the VCSEL array is not imaged onto the scenery. Instead, the VCSEL pattern is provided to a homogenization optics arrangement that provides, in an intermediate plane, a homogeneous intensity distribution that then serves as the basis for generating a desired structured light pattern to be projected onto a scenery or working plane. Even though it may seem counterintuitive to first provide an array of VCSELs forming a VCSEL pattern, then "destroy" the information about the VCSEL pattern and subsequently provide a new pattern, the approach has been found to have several advantages. For example, the embodiments of the present disclosure enable a chip design close to the known design rules. Hence, the design and arrangement of the VCSEL is not necessarily governed by the final structured light pattern to be generated. In addition or in the alternative, reliability problems from CTE (coefficient of thermal expansion) mismatch may be mitigated. A further advantage can be that the yield loss e.g. due to individual laser with low power or defects in a large VCSEL array may be reduced.

Furthermore, the flexibility of providing different optoelectronic apparatuses may be increased. Different applications may require different structured light patterns. It is not efficient to change the VCSEL semiconductor chips for every different use case. For example, instead of providing one large VCSEL array for one specific application, several sub-arrays may be provided from a predetermined set. The sub-arrays may be provided on separate dies. This may also overcome the need to design and provide different VCSEL semiconductor chips for every different use case. Instead, separate VCSEL arrays, e.g. of different sizes and powers, may be combined as needed. Hence, a desired size and/or power may be flexibly provided as a homogeneous intensity in the intermediate plane. The proposed solution may enable the use of standardized chips. The first array of VCSELs can be provided on a first die or first chip. The second array of VCSELs can be provided on a second die or second chip, different from the first die or first chip. A desired structured light pattern may subsequently be generated therefrom. It should further be noted that even a mismatch in pitch may not be critical, since radiation emitted by VCSELs of a VCSEL array is homogenized in an intermediate step in the intermediate plane and the radiation or intensity distribution in the intermediate plane forms the basis for generating the desired structured light patterns. Intensity distributions of different VCSELs of the VCSEL array(s) superimpose in the intermediate plane. This may allow an efficient implementation since only the pattern optics may have to be changed for different applications and different desired structured light patterns. The idea of arranging both homogenization optics, each associated with a different VCSEL array, such that their intensity distributions add up to a common top-hat intensity distribution may solve the problem of how to combine different arrays of VCSELs. Hence, the optoelectronic apparatus with the first and second homogenization optics arrangements can be adapted such that the combination of a first intensity distribution in the intermediate plane based on light emitted by a plurality of VCSELs of the first array of VCSELs and a second intensity distribution in the intermediate plane based on light emitted by a plurality of VCSELs of the second array of VCSELs may, in combination, add up to a common top-hat intensity distribution. A common pattern optics arrangement may be provided to generate a structured light pattern based on said common homogeneous (top-hat) intensity distribution in the intermediate plane.

The inventors recognized that in particular in high power applications, a high power per spot may not allow approaches with a DOE splitter. The inventors further recognized that, creating large numbers of spots, e.g. over 10,000 spots by imaging a VCSEL array with 10,000 lasers, may have two significant drawbacks: Firstly, high yield loss or lifetime issues due to missing spots due to a 1:1 correlation to a single laser per spot. Secondly, such an arrangement may require a very large chip size resulting in assembly and reliability problems due to the high stress from CTE (coefficient of thermal expansion) mismatch over a large chip size. It should be noted that tiling of VCSEL chips is not easily done, as a placement accuracy for aligning separate VCSEL chips may usually be larger than an allowed spot deviation in the pattern. Moreover gaps between separate VCSEL chips may usually be too large. Moreover, tiling of chips with each having separate optics may multiply the cost and needed space for and imaging lenses and their precise alignment by the number of VCSEL chips. The proposed solution may overcome one or more of these issues.

The following refinements may apply mutatis mutandis to the first and/or second VCSEL array(s). Accordingly, the following refinements may apply mutatis mutandis to the first and/or second homogenization optics arrangement(s).

According to an embodiment, the homogenization optics arrangement may be adapted such that a contribution of each individual VCSEL of the VCSEL array to an intensity at a surface element or each surface element of the intermediate plane is less than 10%, in particular less than 5%, in particular less than 2%, in particular less than 1% of an intensity of light emitted by the VCSEL array at said surface element. An advantage of this embodiment is that an individual faulty VCSEL may have a very limited effect on an intensity distribution of the structured light pattern which may even be tolerated. Hence, yield, device lifetime and/or reliability may be improved.

The homogenization optics arrangement may be adapted to provide, as the homogeneous intensity distribution, a top-hat intensity distribution in the intermediate plane. A full width at half maximum, FWHM, diameter of the top-hat may be larger than a diameter of the array of VCSELs. A top-hat intensity distribution can have a constant intensity for at least half, in particular for at least 80%, in particular for at least 90% of the full width half maximum angle. A constant intensity or area having a constant intensity may refer to a substantially constant intensity, e.g. having tolerances of no more than +/−20% of an average intensity, in particular no more than 10% of an average intensity in said area of constant intensity.

The homogenization optics arrangement may be adapted such that a contribution of an individual VCSEL to an intensity at the surface element of the intermediate plane, in particular to a surface element having an intensity of at least 80% of a maximum of the top-hat intensity distribution, is at least 5% of the intensity of light emitted by the VCSEL array at said surface element divided by the number of all VCSELs irradiating said surface element. In addition or in the alternative, the homogenization optics arrangement may be adapted such that a contribution of an individual VCSEL or even each (active) VCSEL of the VCSEL array to an intensity at the surface element of the intermediate plane is at least 5% of the intensity of light emitted by the VCSEL array at said surface element divided by the number of VCSELs of the array of VCSELs. Hence, the homogenization optics arrangement can be adapted such that an individual VCSEL of the VCSEL array provides at least minimum contribution but no more than maximum contribution. It shall be understood, that defective pixels or pixels that are controlled not to emit radiation, i.e., inactive VCSELs may be disregarded in this determination. The number of VCSELs may refer to the number of VCSELs of the VCSEL array or the number of active VCSELs of the VCSEL array that are controlled to emit light.

According to an embodiment, the optoelectronic apparatus may be adapted to generate a dot pattern or stripe pattern as the structured light pattern. A dot pattern may also be referred to as point pattern. A dot pattern may be used for sampling a scene at different positions, e.g. corresponding to the dots in a 3D camera using time of flight distance measurement. The electronic apparatus may also be adapted to generate different patterns such as stripes or different shapes.

The homogenization optics arrangement may comprise a microlens array adapted to provide a homogeneous intensity distribution of light emitted by a plurality of VCSELs of the array of VCSELS in the intermediate plane. In particular, the homogenization optics arrangement may comprise a chirped microlens array. For example, the chirped microlens array may comprise one or more tilted micro lenses that are arranged to redirect light emitted by pixel in non-central position of the pixel array from our peripheral region to a more central region of the intensity distribution in the intermediate plane.

In a refinement, the at least first microlens of the microlens array may be adapted to project a first magnified image of an active area of a corresponding first VCSEL of the VCSEL array onto the intermediate plane; and at least a second microlens of the microlens array may be adapted to project a second magnified image of an active area of a corresponding second VCSEL of the VCSEL array onto the intermediate plane. The first microlens and the second microlens may be adapted to project the first and the second magnified image in the intermediate plane so as to provide an aligned superposition of the first and the second magnified image in the image plane. Both the first VCSEL and the second VCSEL may illuminate the same or at least an almost identical area on the intermediate plane. The first and the second magnified image may have the same overall shape and may coincide in the intermediate plane. It will be understood that an entire VCSEL array having a large number of VCSELs, e.g. tens, hundreds or thousands of VCSELs may be adapted accordingly with respective microlenses.

In addition or in the alternative, the homogenization optics arrangement may comprise a fly-eye condenser. In addition or in the alternative, the homogenization optics arrangement may comprise a rod-homogenizer, in particular a rectangular-shaped or square-shaped rod-homogenizer. The respective elements such as the fly-eye condenser and the rod-homogenizer, alone or optionally in combination with further elements, may be adapted to provide a homogeneous intensity distribution of light emitted by a plurality of VCSELs of the array of VCSELS in the intermediate plane.

In addition or in the alternative, the homogenization optics arrangement may comprise a defocused lens arrangement adapted to project a defocused image of the VCSELS in the intermediate plane, in particular adapted to project a defocused image of the full VCSEL array to the intermediate plane. In other words, an unsharp optionally magnified image of VCSEL array may be provided to the subsequent pattern optics arrangement, for example formed by a MLA.

The pattern optics arrangement optics may comprise a (large) microlens array, MLA. Optionally, neighboring lenses of the microlens array may have a pitch different than, i.e. a pitch larger or smaller than a pitch or separation of neighboring VCSELs of the VCSEL array. For example, the pitch of neighboring lenses of the microlens array may be at least 20%, at least 50%, at least 100%, at least 200%, at least 500% larger or smaller than a pitch of neighboring VCSELs or the VCSEL array. By providing a homogeneous intensity distribution in an intermediate plane, there is no need for providing individual microlenses corresponding to individual VCSELs. This allows for modular approach and thus increased flexibility. The position of the microlenses may depend on the position of the corresponding spot with respect to its neighbors. A total number of spots may give the total size of the lens array.

The pattern optics arrangement may comprise a microlens array. The pattern optics arrangement may be arranged to provide a structured light pattern, in particular a spot pattern, in a focal plane of the microlenses of said microlens array. An advantage of this embodiment can be a position of a structure of the structured light pattern, for example a spot position of the structured light pattern, may be independent of a (lateral) position of the VCSEL array with respect to the pattern optics arrangement. A lateral position may refer to a position in a plane orthogonal to an optical axis of a VCSEL. An optical axis of a VCSEL may refer to a central beam direction of light emitted by the VCSEL. For example, in contrast to conventional approaches, there may be no need to adjust a position of the pattern optics arrangement, e.g. a position of a microlens of the pattern optics arrangement, with respect to a position of a laser of the VCSEL array. A spot size in a focal plane may equal a focal length of a microlens times a beam divergence in front of the microlens.

Optionally, the homogenization optics arrangement may be adapted to (pre-)collimate light emitted by the VCSELs of the VCSEL array. Thereby, a requirement regarding the pattern optics arrangement may be relaxed. For example, an optical power of microlenses of the microlens array of the pattern optics arrangement may be reduced. Otherwise, a focal length of microlenses of the pattern optics arrangement might have to be very short. Such a microlens array may be difficult to manufacture and/or a divergence after a first stage, e.g. the MLA, of the pattern optics arrangement may be too wide such that a complex projection optics would have to be used. Hence, with the proposed solution, the manufacturing of the pattern optics arrangement may be simplified.

The pattern optics arrangement optics may comprise a projection lens adapted to project the structured light pattern onto a (distant) scene or working plane or field-of-view (FOV). It shall be understood that a projection lens may be used in combination with microlens array. Hence, only a limited optical power may have to be provided by the microlens array. The remaining optical power may be provided by the projection lens. Optionally, large (off-the-shelf) optics can be used to image structured light pattern to the field of view. Large optics may refer to an optical element having a diameter larger than the homogenization optics arrangement. Generally speaking, the projection lens or field lens may be designed to image the total size of the MLA to a desired field-of-view.

The homogenization optics arrangement and the pattern optics arrangement may comprise a combined integrally formed arrangement, in particular by injection-molding. For example, a rod-homogenizer of the homogenization optics arrangement may be integrally formed with a micro-lens array e.g. by injection-molding. An advantage of this embodiment may include one or more of simplified manufacturing, low cost, and simplified alignment. Optionally, the pattern optics arrangement may comprise a projection optics arrangement, such as a projection lens, that may be implemented as a combined element or integrally formed arrangement. Several optical elements may be formed as one piece, in particular by injection-molding.

The structured light pattern generated by the pattern optics arrangement may comprise a different number of rows and/or columns than a number of rows and/or columns of the VCSEL array. It shall be understood that lower orders, diffraction effects and/or replications by DOEs may not be counted to said number of rows and/or columns. Hence, different structured light patterns may be generated irrespective of the underlying arrangement of VCSELs of the VCSEL array.

The apparatus may comprise a second array of vertical cavity surface emitting lasers, VCSELs; a second homogenization optics arrangement adapted to provide, based on light emitted by a plurality of VCSELs of the second array of VCSELs, a second homogeneous intensity distribution in an intermediate plane; a second pattern optics arrangement adapted to generate a second structured light pattern based on the second homogeneous intensity distribution in the intermediate plane. Hence, several arrays may be combined. As explained above, the previously mentioned VCSEL array may be referred to as a first VCSEL array, the previously mentioned homogenization optics arrangement may be referred to as a first homogenization optics arrangement, and the pattern optics arrangement may be referred to as a first pattern optics arrangement. Optionally, the first homogenization arrangement and the second homogenization arrangement may be adapted to provide the first and the second homogeneous intensity distribution in the same intermediate plane. Optionally, the first pattern optics arrangement and the second pattern optics arrangement may form a (combined or overall) pattern optics arrangement, wherein the (combined) pattern optics arrangement is adapted to generate a structured light pattern based on the homogeneous intensity distribution provided by the first and the second homogenization optics arrangement in the intermediate plane. Optionally, the first and the second homogenization optics arrangement may form a (combined or overall) homogenization optics arrangement that is adapted to provide the functionality of the first and the second homogenization optics arrangement. An advantage of these embodiments can be that a good position accuracy of all the spots with respect to each other may be provided. For example, no separate high-precision alignment of separate pattern optics arrangements and/or separate homogenization optics arrangements relative to each other may be needed.

The pattern optics arrangement and the second pattern optics arrangement may be adapted such that the structured light pattern and the second structured light pattern are directed at different regions. The first structured light pattern and the second structured light pattern may be e.g. directed at different regions in a working plane or to different fields of view. The different regions may be overlapping, partially overlapping or non-overlapping.

The apparatus may comprise a second pattern optics arrangement. The pattern optics arrangement can be adapted to generate a first structured light pattern based on a first portion of the common homogeneous intensity distribution in the intermediate plane; and the second pattern optics arrangement can be adapted to generate a second structured light pattern based on a second portion of the common homogeneous intensity distribution in the intermediate plane.

In a refinement, the pattern optics and the second pattern optics may be adapted such that a separation between the structured light pattern and the second structured light pattern does not exceed a separation between neighboring structures of the structured light pattern. For example, the pattern optics and the second pattern optics may be adapted to provide a dot pattern, in particular two separate dot patterns. However, the dot pattern provided by the first pattern optics arrangement and the second dot pattern provided by the second pattern optics arrangement may together provide a continuous or regular dot pattern, e.g. providing dots with continuous pitch, without 'gaps' or other discontinuities between the dot patterns provided by the different pattern optics arrangements. The term separation may refer to a closest distance between two elements. The proposed solution may thus provide a significant advantage over prior art solutions, wherein either large monolithic arrays have to be used to provide patterns free from discontinuities or wherein more sophisticated and expensive imaging optics are employed.

A further advantage of providing a homogeneous intensity distribution in an intermediate plane, as suggested herein, may be that alignment tolerances for placing the pattern optics arrangement with respect to the VCSEL array may be relaxed. Thereby the manufacturing cost may be reduced and the yield may be increased.

Regarding the system, it should be noted that the controller may optionally be adapted to selectively control a subset of VCSELs of the VCSEL array. As used herein VCSELs of the VCSEL array may refer to active VCSELs of the array.

It is to be understood that the optoelectronic apparatus, the system and the method may have similar and/or identical refinements and embodiments.

It shall be understood that a preferred embodiment of the invention can also be any combination of the dependent claims with the respective independent claim. Further advantageous embodiments are defined below.

Figure 1:
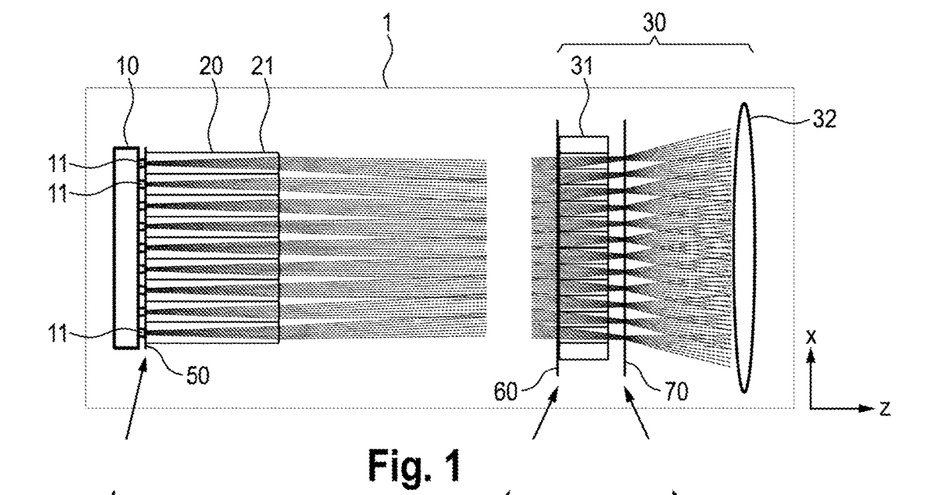
FIG. 1 shows a schematic diagram of an optoelectronic apparatus adapted to generate a structured light pattern.

FIG. 1 schematically shows a first embodiment of an optoelectronic apparatus adapted to generate a structured light pattern. The apparatus is therein denoted in its entirety by reference numeral 1. The optoelectronic apparatus 1 comprises an array 10 of vertical cavity surface emitting lasers, VCSELs, 11. The VCSELs 11 can be implemented as top emitters or bottom emitters. In the example shown in FIG. 1, the VCSELs 11 are implemented as top emitters.

The light emitted by the VCSELs 11 is provided to a homogenization optics arrangement 20. The homogenization optics arrangement 20 is adapted to provide, based on light emitted by a plurality of VCSELs 11 of the VCSEL array 10, a homogeneous intensity distribution in an intermediate plane 60. Further, a pattern optics arrangement 30 is provided that is adapted to generate a structured light pattern 70 based on the homogeneous intensity distribution in the intermediate plane 60. In the example shown in FIG. 1, the homogenization arrangement 20 comprises a first microlens array 21 arranged on top of the VCSEL array 10, which is spaced at some distance from the pattern optics arrangement 30. The pattern optics arrangement may comprise a second microlens array 31, in particular a large microlens array (MLA).

Figure 2:
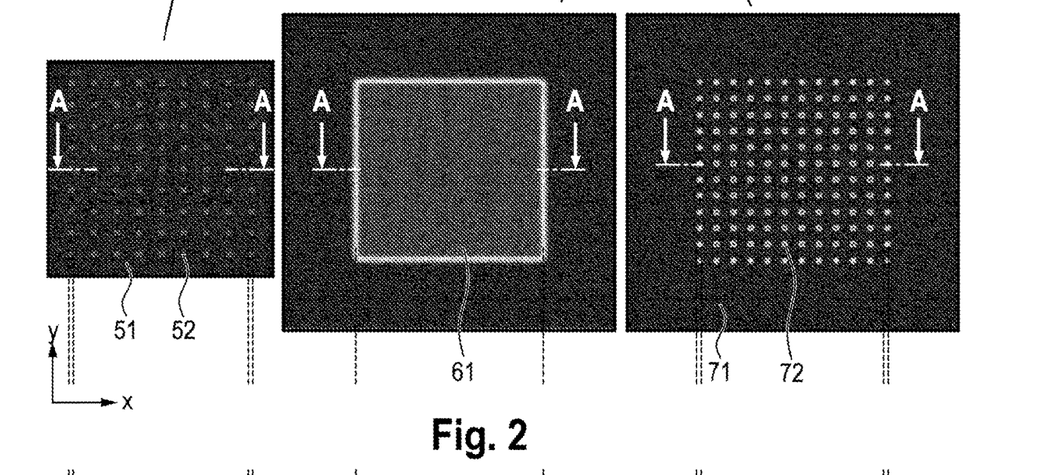
FIG. 2 shows intensity distributions at different positions of FIG. 1.
Figure 3:
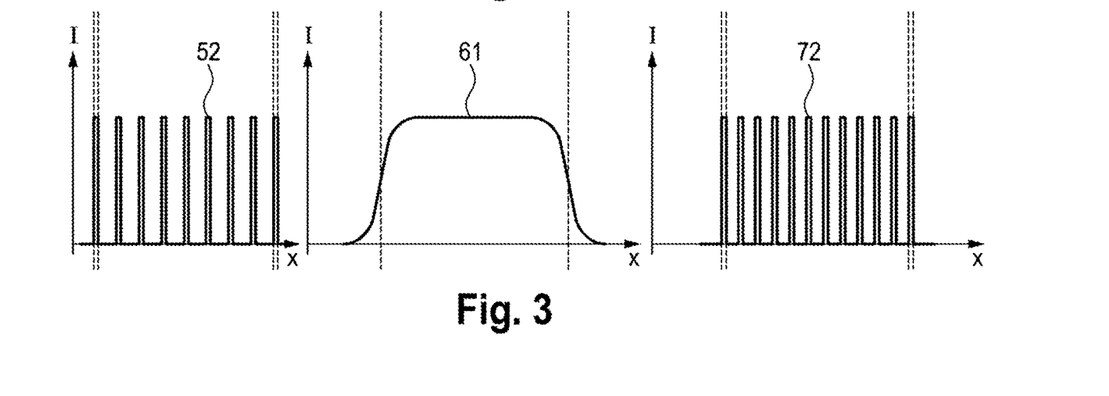
FIG. 3 shows a cross-sectional view of the intensity distributions of FIG. 2.

FIG. 2 and FIG. 3 show exemplary graphs illustrating intensity distributions at different positions 50, 60 and 70 of FIG. 1. The left graph in FIGS. 2 and 3 shows an intensity distribution in a plane 50 of FIG. 1 at the output of the VCSEL array 10. The middle graph in FIGS. 2 and 3 shows an intensity distribution in the intermediate plane 60 of FIG. 1 after homogenization by the homogenization optics arrangement 20. The right graph in FIGS. 2 and 3 shows an intensity distribution in plane 70 of FIG. 1 after at least a first part 31 of the pattern optics arrangement 30 adapted to generate a structured light pattern based on the homogeneous intensity distribution in the intermediate plane 60.

The intensity distribution 51 in FIG. 2, left graph shows the intensities 52 provided by individual VCSELs 11 of the VCSEL array 10. The left graph in FIG. 3 shows a corresponding cross-sectional view along line A-A in the respective graph in FIG. 2. In the given example an array of 9×9 VCSELs is provided. The shape of the intensity distribution of each individual VCSEL as shown therein may reflect the shape of the active area. It can be seen as a simplified sketch of the intensity profile of the near field.

The homogenization optics arrangement 20, as exemplarily shown in FIG. 1, is adapted to convert the radiation emitted by a plurality of VCSELs of the array of VCSELs, preferably of all VCSELs of the array of VCSELs into a homogeneous intensity distribution in the intermediate plane 60. This is exemplarily shown by the top-hat intensity profile in the middle graph of FIG. 2. The homogeneous intensity distribution may be provided by the central portion of the top-hat intensity profile.

The resulting intensity distribution 61 in the intermediate plane 60 comprises a superposition of contributions from a plurality of individual VCSELs 11 of the VCSEL array 10. The homogenization optics arrangement can be adapted such that a contribution of an individual VCSEL, in particular of each individual VCSEL of the VCSEL array to an intensity at a surface element of the intermediate plane 60 is less than 20%, in particular less than 5%, in particular less than 2%, in particular less than 1% of intensity of light emitted by the VCSEL array at said surface element. For example, light of at least seven lasers, preferably of at least 20 lasers, preferably of at least 30 lasers may be superimposed in the region of the homogeneous intensity distribution in the intermediate plane, in particular in each surface element of the homogeneously illuminated area in the intermediate plane. A portion of homogeneous intensity distribution in the intermediate plane can be characterized by an intensity variation of less than 10%, in particular less than 20%.

The homogenization optics arrangement can be adapted to provide a top-hat intensity distribution as the homogeneous intensity distribution. In particular, a full width at half maximum (FWHM) diameter of the top-hat may be larger than a diameter of the array of VCSELs. The FWHM diameter is illustrated by the dashed lines in the center graphs of FIGS. 2 and 3. The homogeneous intensity distribution in the intermediate plane may cover a portion of the intermediate plane. The portion of homogeneous intensity distribution can be characterized in that a relative variation of the intensity is less than 20%, in particular less than 10%, in particular less than 5%, in particular less than 2%. It should be noted, that with the solution proposed herein, a homogeneous intensity may even be achieved if an individual VCSEL of the VCSEL array is defect, because each VCSEL only provides a limited contribution to each surface element of the homogeneous intensity distribution.

In the example shown in FIG. 1, the homogenization optics arrangement 20 comprises a microlens array adapted to provide the homogeneous intensity distribution of light emitted by a plurality of VCSELs 11 of the array of VCSELs 10 in the intermediate plane 60. Each VCSEL 11 of the VCSEL array 10 may be provided with a microlens 21. A first microlens of the microlens array can be adapted to project a first magnified image of an active area of the corresponding VCSEL 11, as shown by reference numeral 52 in the left graph of FIG. 2, onto the intermediate plane 60. The intensity distribution 61 in the intermediate plane 60 may correspond to a magnified image of the active area 52 of an individual VCSEL 11. The array of microlenses 21 may comprise an array of chirped or tilted microlenses that are adapted to redirect images of the active areas of the plurality of VCSELs towards each other so as to provide an aligned superposition of the magnified images of the active areas of the VCSELs in the intermediate plane 60.

A size of the region of homogeneous intensity distribution in the intermediate plane may be larger than a size of the VCSEL array. This will be explained in more detail with reference to FIGS. 5 to 7 further below.

Turning now to the right graphs in FIGS. 2 and 3, the pattern optics arrangement 30 can be adapted to generate a structured light pattern 71 based on the homogeneous intensity distribution 61 in the intermediate plane 60.

In the given example, the pattern optics arrangement 30 is adapted to generate a dot pattern comprising a plurality of dots 72 as the structured light pattern 71. It should be noted, that the structured light pattern 71 generated by the pattern optics arrangement 30 is decoupled and thus largely independent of the specific arrangement of the plurality of VCSELs 11 of the VCSEL array 10 in plane 50. For example, the 9×9 VCSEL pattern shown in the left hand graph of FIG. 2 can be turned into a structured light pattern 71 having a different number of spots 72. This approach is also exemplarily shown in the cross-sectional view of FIG. 3, wherein the light emitting areas of 9 VCSELs providing the respective intensity 52 are first converted into a homogeneous intensity distribution 61 in the intermediate claim, as shown in FIG. 3 middle graph, which is then converted into a desired structured light pattern 71 having a different number of intensity peaks 72, as shown in FIG. 3 right hand graph. Hence, the structured light pattern 71 generated by the pattern optics arrangement 30 may comprise a different number of rows and/or columns than a number of rows and/or columns of the VCSELs 11 of the VCSEL array 10.

An advantage of this approach is that in case different structured light patterns are desired, the same homogeneous intensity distribution 61 may be used to generate such different structured light patterns. Only the pattern optics arrangement 30 may be changed. However, it is also possible to use the same pattern optics arrangement 30 with different VCSEL arrays 10 by providing a modified homogenization optics arrangement 20 that is adapted to provide the homogeneous intensity distribution in the intermediate plane 60. Hence, the flexibility can be substantially improved. As a further advantage, the manufacturing cost for may be reduced in view of the modular approach.

Figure 4:
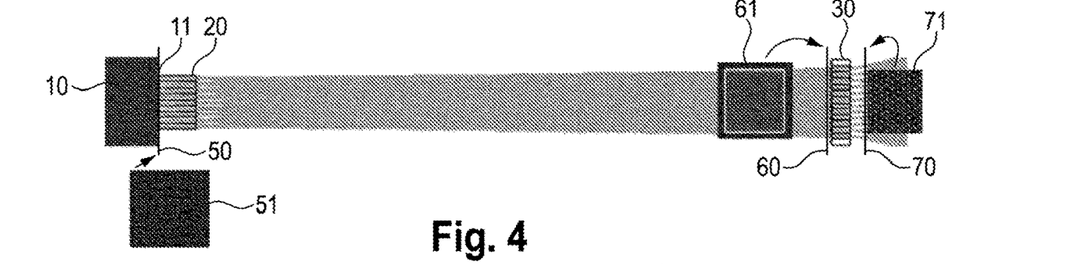
FIG. 4 shows a schematic diagram of an optoelectronic apparatus adapted to generate a structured light pattern having one VCSEL array.

FIG. 4 shows an overview diagram of the apparatus adapted to generate a structured light pattern as shown in FIG. 1.

Figure 5:
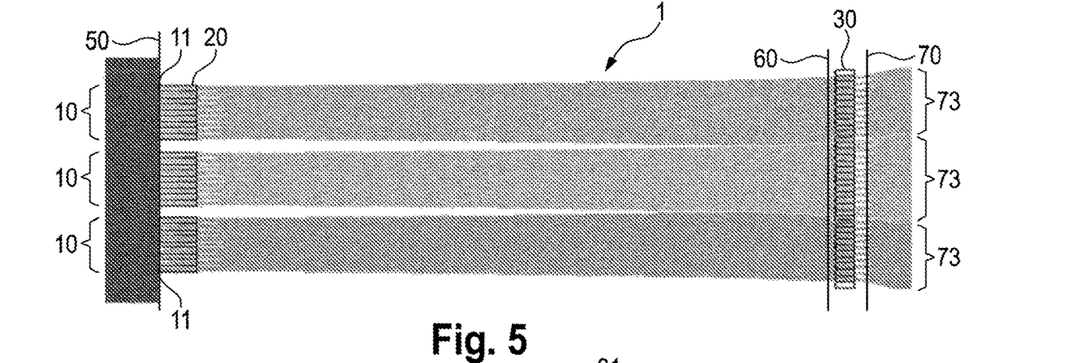
FIG. 5 shows a schematic diagram of an optoelectronic apparatus adapted to generate a structured light pattern having a plurality of VCSEL arrays.
Figure 6:
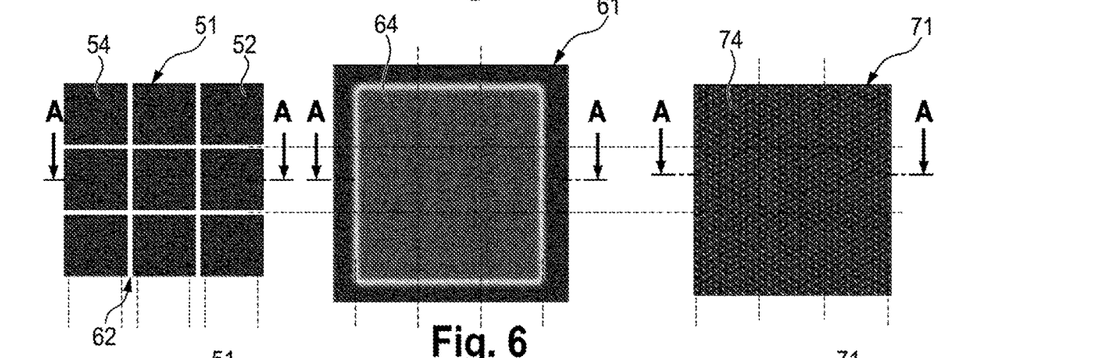
FIG. 6 shows intensity distributions at different positions of FIG. 5.
Figure 7:
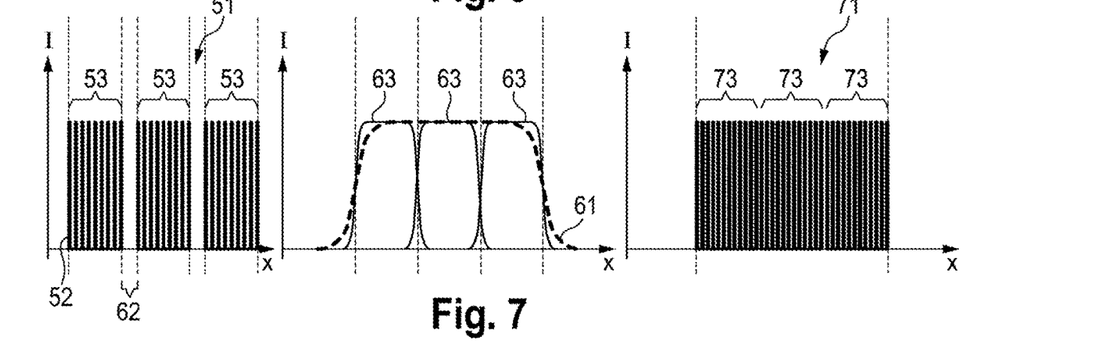
FIG. 7 shows a cross-sectional view of the intensity distributions of FIG. 6.

FIGS. 5 to 7 show a further embodiment of an apparatus 1 adapted to generate a structured light pattern and the respective intensity distributions at different locations within the apparatus. The apparatus can be seen as a combination of apparatuses or features of the apparatus as described with FIGS. 1 to 4. In the following, additional aspects will be highlighted.

FIG. 5 shows an overview of the apparatus 1 adapted to generate a structured light pattern. The optoelectronic apparatus 1 comprises a first array 10 of vertical cavity surface emitting lasers 11, VCSELs; a first homogenization optics arrangement 20 associated with the first array of vertical cavity surface emitting lasers; a second array 10 of vertical cavity surface emitting lasers 11, VCSELs; and a second homogenization optics arrangement 20 associated with the second array of vertical cavity surface emitting lasers. The optoelectronic apparatus 1 further comprises homogenization optics arrangements 20, each associated with a different VCSEL array, that are arranged such that their intensity distributions add up to a common homogeneous top-hat intensity distribution in an intermediate plane 60. The optoelectronic apparatus 1 further comprises a pattern optics arrangement 30 adapted to generate a structured light pattern 70 based on the common homogeneous intensity distribution in the intermediate plane 60. In the example shown in FIG. 5, three VCSEL arrays 10 are provided with associated homogenization optics arrangements 20. However, different numbers of VCSEL arrays may be combined.

Further to the features described with reference to FIG. 1 the apparatus now comprises a plurality of VCSEL arrays 10 and a plurality of homogenization optics arrangements 20. In the given example, nine VCSEL arrays 10 are provided that are arranged in a 3×3 matrix. However, different numbers and geometric arrangements of VCSEL arrays are possible and the disclosure is not limited to a particular arrangement. In the given example, each VCSEL array 10 is provided with a corresponding homogenization optics arrangement 20. However, it is also possible to provide a common homogenization optics arrangement 20 or to share a homogenization optics arrangement 20 between at least a subset of multiple VCSEL arrays 10.

FIG. 6, left graph shows a top view onto the light-emitting areas 52 of the 3×3 arrangement of a plurality of VCSEL arrays 10 in plane 50 of FIG. 5. The left hand graph in FIG. 7 shows an intensity distribution along line A-A in the left graph of FIG. 6. As can be seen in this graph, the individual VCSEL arrays 10 can be separated by a distance 62 and can form different groups 53.

In the given example, each of the homogenization optics arrangements 20 is configured to provide, based on light emitted by a plurality of VCSELs 11 of the corresponding VCSEL array 10, a homogeneous intensity distribution 63 in the intermediate plane 60. The homogenization optics arrangements 20 or a combined homogenization optics arrangement can be configured such that neighboring homogeneous intensity distributions 63 of at least two separated VCSELs arrays 10 together form a combined homogeneous intensity distribution 61 in the intermediate plane. In the given example, the top-view in the middle graph in FIG. 6 may show a combination of a 3×3 array of homogeneous intensity distributions in the intermediate plane 60. The top left homogeneous intensity distribution 64 is provided by the VCSEL array denoted by reference numeral 54 in the left hand graph in FIG. 6.

Referring to the central graphs in FIGS. 6 and 7, the respective homogenization optics arrangements 20 are adapted to provide, based on light emitted by VCSELs of the corresponding arrays of VCSELs 10 a homogeneous intensity distribution 61 in the intermediate plane 60. The intensity distribution in the intermediate plane 60 results from a superposition of the individual homogeneous intensity distributions 63 that are provided by the corresponding VCSEL arrays 10 with the corresponding homogenization optics 20. Generally, the homogenization optics arrangements 20, each associated with a different VCSEL array 10, may be arranged such that their intensity distributions add up to a common homogeneous top-hat intensity distribution in the intermediate plane 60.

In an embodiment, the apparatus comprises a first array 10 of vertical cavity surface-emitting lasers, VCSELs, a first homogenization optics arrangement 20 adapted to provide, based on light emitted by a plurality of VCSELs of the first array of VCSELs 10, a first homogeneous intensity distribution 63 in the intermediate plane 60 and a second array of vertical cavity surface-emitting lasers, VCSELs and an associated second homogenization optics arrangement adapted to provide, based on light emitted by a plurality of VCSELs of the second array of VCSELs, a second homogeneous intensity distribution in an intermediate plane 63. The cross-sectional view in the middle graph of FIG. 7 shows a combination of three homogeneous intensity distributions 63 in the intermediate plane, here as top-hat intensity distributions. The first top hat intensity distribution 63 and the second top hat intensity distribution 63 can be adjacent to each other and together form a combined top-hat intensity distribution 61 providing a homogeneous intensity distribution in the intermediate plane 60. The center graph in FIG. 6 shows the combined homogeneous intensity distribution.

Based on the homogeneous intensity distribution 61 in the intermediate plane 60, a pattern optics arrangement 30 can be provided that is adapted to generate a structured light pattern 71. It shall be understood, that a separate first and second pattern optics arrangement can be provided that is adapted to generate a first and second structural light pattern based on the first and second homogeneous intensity distribution in the intermediate plane. However, advantageously a combined or single pattern optics arrangement 30 may be provided that is adapted to generate a structured light pattern 71 based on the homogeneous intensity distribution in the intermediate plane 60. For example, a dot pattern may be provided as shown in the right hand graph of FIG. 6.

An advantage of this arrangement of providing a homogeneous intensity distribution in the intermediate plane can be that despite a gap 62 between the individual VCSEL arrays 10, a gapless structured light pattern may be provided. As shown in FIG. 7, specially separated groups 53 of light emitted by different VCSELs 11, may provide adjacent homogeneous intensity distributions 63 in the intermediate plane that then result in separate groups 73 of elements within the structured light pattern 71. However, the influence of an individual VCSEL to this structured light pattern is now very limited. For example, in the given embodiment a 9×9 array of VCSELs may contribute to the homogeneous intensity distribution 63 in the intermediate plane. Hence, the contribution of an individual VCSEL to the intensity may be one divided by the number of light-emitting VCSELs. For the example of a 9×9 array of VCSELs the contribution of an individual VCSEL may be 1:81 or 1.2%. Consequently, a defect of such a pixel may not substantially affect the functionality of the device. Hence, the reliability and yield can be improved. It should further be noted that a defect of a single VCSEL does not result in a missing spot or group of spots but merely slightly reduces homogeneous intensity distribution 63. The impact on the intensity of a group of spots of the structured light pattern 71 may thus be very limited.

For example a defect of a single VCSEL 54 in FIG. 6 left graph, will affect an entire field 64 in FIG. 6 middle graph, albeit at a very low level. Consequently, the structured light pattern in an entire field 74 that is generated from the homogeneous intensity distribution in field 64 is again only affected at a very low level. However, the defective VCSEL does not result in missing spots.

Figure 8:
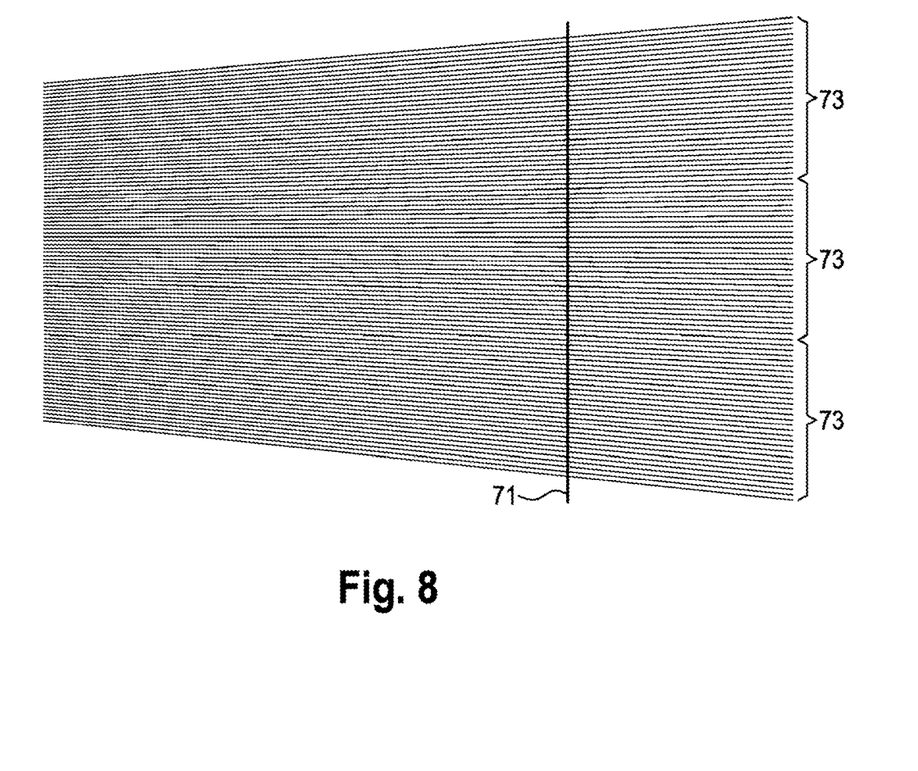
FIG. 8 shows a graph of a side view of a plane of a beam pattern in the far field comprising equidistantly spaced groups of beams.

FIG. 8 illustrates that a continuous pattern of dots or beams may be provided without unregular gaps between the individual beams of the pattern, even though gaps may be provided between individual VCSEL arrays 10. Such a gap or separation between VCSEL arrays is exemplarily shown by the separation 62 of light emitted by the VCSEL arrays 10 in the left-hand graph in FIG. 7 and also in FIG. 9.

Figure 9:
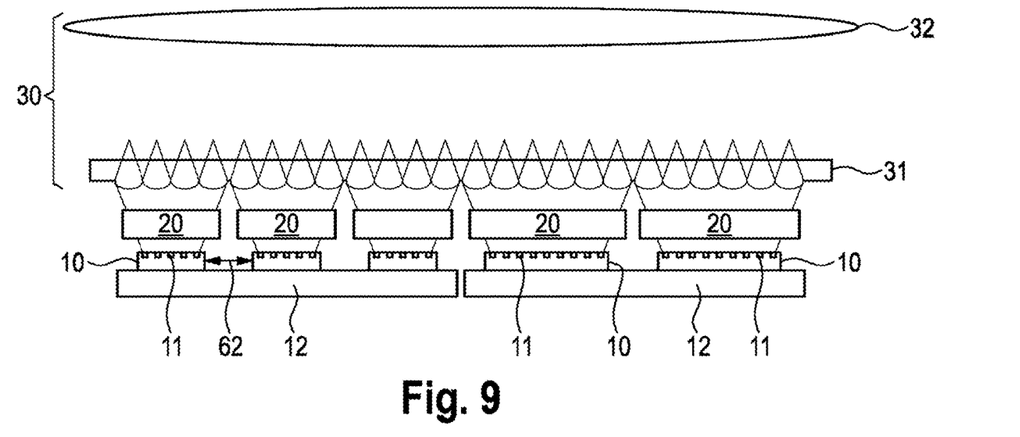
FIG. 9 shows a further schematic diagram of an optoelectronic apparatus comprising a plurality of VCSEL arrays.

FIG. 9 shows a more detailed schematic diagram of an apparatus comprising a combination of several separate pixel arrays 10. A plurality of VCSEL arrays 10 may be provided on a carrier 12 wherein the VCSEL arrays 10 are separated by a distance 62. The carrier can be at least one of a printed circuit board, PCB, a ceramic board, a (silicon) driver and/or may be a cooling structure. Each VCSEL array 10 may comprise a plurality of VCSELs 11. The carrier 12 can comprise a plurality of separate VCSEL arrays 10. Moreover, more than one carrier 12 may be provided each comprising one or more separate VCSEL arrays 10. Hence, instead of providing a large VCSEL array 10 that may suffer from a limited manufacturing yield or may be limited in size due to the CTE (coefficient of thermal expansion) mismatch, a plurality of separate VCSEL arrays 10 can be provided.

A homogenization optics arrangement, schematically shown by box 20, can be provided that is adapted to provide, based on light emitted by a plurality of VCSELs 11 of the VCSEL array 10, a homogeneous intensity distribution in an intermediate plane. The homogenization optics arrangements 20 of neighboring VCSEL arrays 10 can be adapted to provide a combined, continuous homogeneous intensity distribution in the intermediate plane. Hence, despite the separation 62 between the VCSEL arrays, a continuous homogeneous intensity distribution can be provided. Based on the homogeneous intensity distribution in the intermediate plane, the pattern optics arrangement 30 can be adapted to generate a desired structured light pattern.

Optionally, even different VCSEL arrays 10 and carriers 12 can be combined as illustrated by the different configurations used on the left and right hand side in FIG. 9.

The size of the individual VCSEL arrays or sub-arrays can be defined by the needed VCSEL array size to generate the needed power and/or a needed unit cell size of a driver circuit. The number of spots in a VCSEL array or sub-array can define a number of individual microlenses in array and their aperture size. For good efficiency, a fill factor of the microlens array may be close to 100%. For example, rectangular apertures may be used instead of round apertures with gaps.

FIG. 10A-H show schematic diagrams of several exemplary embodiments comprising different homogenization optics arrangements 20.

Figure 10A:
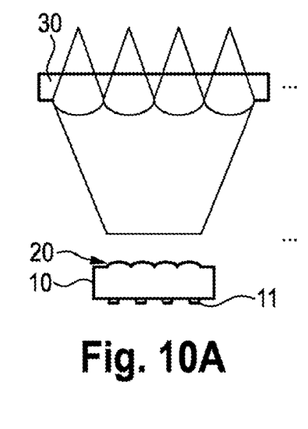
FIGS. 10A-10H show schematic diagrams of exemplary embodiments of different homogenization optics arrangements.

FIG. 10A shows a first embodiment of an optoelectronic apparatus adapted to generate a structured light pattern. The homogenization optics arrangement 20 may be provided by a chirped microlens array as already described with reference to the previous figures. In order to enable a more compact design, it is possible to use a bottom emitter VCSEL array 10. Advantageously, the homogenization optics arrangement 20 may be directly applied to an opposing side of a carrier structure of the VCSEL array 10 so as to enable a compact design.

Figure 10B:
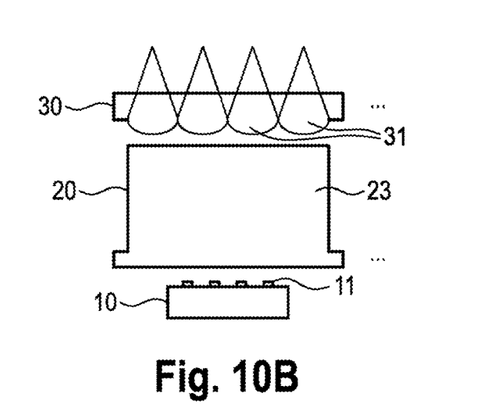
Figure 10C:
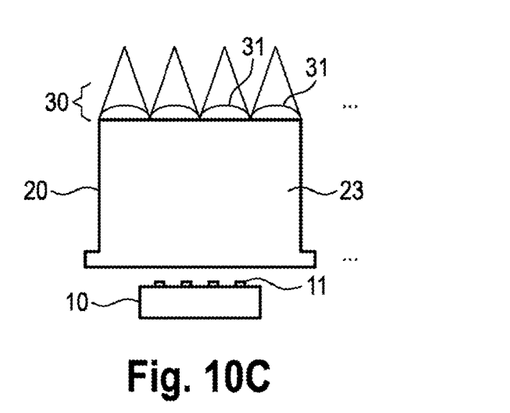

FIG. 10B shows an embodiment of a rod-homogenizer 23 as the homogenization optics arrangement 20 adapted to provide, based on light emitted by a plurality of VCSELs 11 of the array of VCSELs 10 a homogeneous intensity distribution in an intermediate plane. The pattern optics arrangement 30 may be implemented as a separate structure that may comprise a large microlens array 31. FIG. 10C shows a further refinement wherein the homogenization optics arrangement 20 is co-integrated with the pattern optics arrangement 30. For example, a square-shaped rod homogenizer 23 may be provided having a microlens array comprising a plurality of microlenses 31 on the top surface.

Figure 10D:
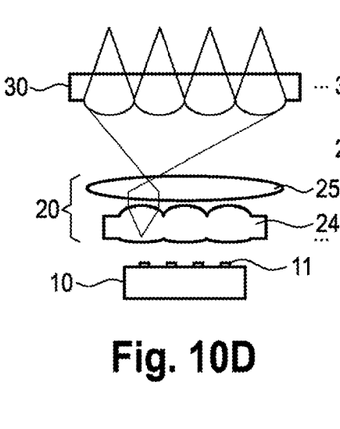
Figure 10E:
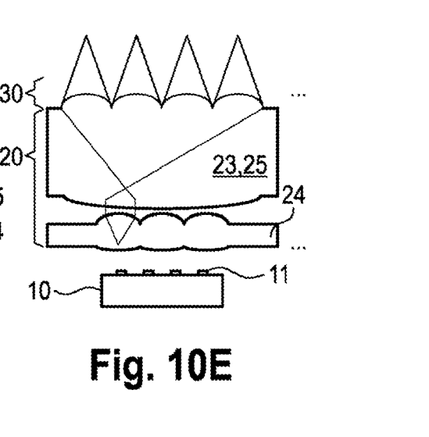
Figure 10F:
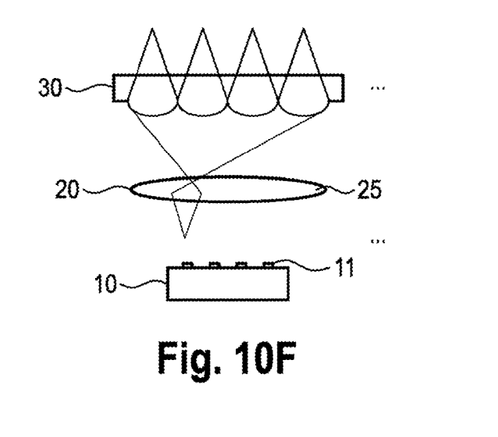

FIG. 10D shows a further embodiment wherein the homogenization optics arrangement comprising a fly-eye condenser 24 and optionally a lens 25. As shown in FIG. 10E, the lens 25 may form a co-integrated element together with the pattern optics arrangement 30. Optionally, a fly-eye condenser 25 may be combined with a rod homogenizer 23.

Figure 10G:
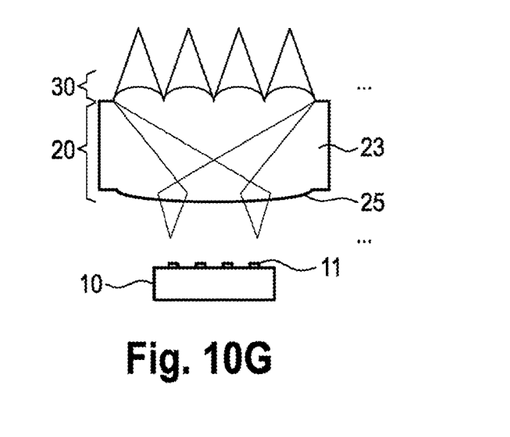

FIG. 10E shows a further embodiment of an apparatus according to the present disclosure, wherein the homogenization optics arrangement 20 comprises a defocused lens arrangement 25 adapted to project a defocused image of VCSELs 11, in particular of the full VCSEL array 10 onto an intermediate plane from which the pattern optics arrangement 30 is adapted to generate the structured light pattern. As shown in FIG. 10G, the lens arrangement 25 may optionally be combined with a rod homogenizer 23 or may simply be co-integrated with the pattern optics arrangement 30, here again in form of a microlens array.

Figure 10H:
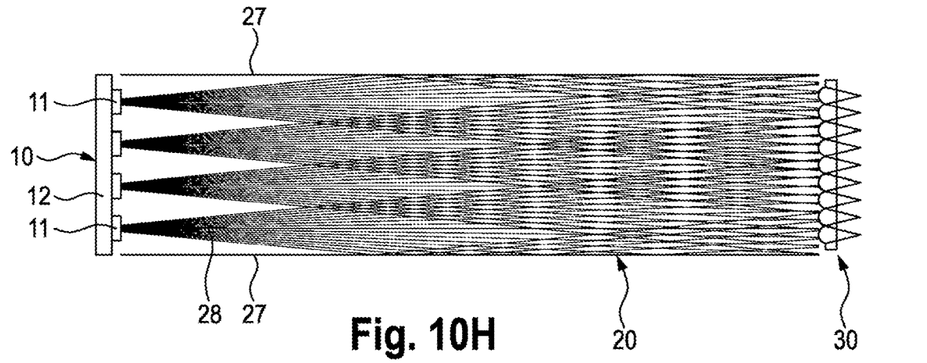

FIG. 10H shows a further embodiment, wherein the homogenization optics arrangement 20 comprises a light guiding and/or reflecting structure 27 adapted to provide, based on light emitted by a plurality of VCSELs 11 of the VCSEL array 10 a homogeneous intensity distribution in an intermediate plane. A mirror or reflector 27 can be provided, that is adapted to redirect non-overlapping radiation in a peripheral region 28 of light emitted by a VCSEL of the VCSEL array back towards an optical axis of light leaving the VCSEL array. Thereby, a more homogeneous intensity distribution can be provided in an intermediate plane for subsequent formation of the structured light pattern by the pattern optics arrangement 30. The light guiding and/or reflecting structure 27 is arranged between the VCSEL array 10 and the pattern optics arrangement 30, wherein a distance between the VCSEL array and the pattern optics arrangement may be at least $d/\tan(\gamma)$, in particular at least $2 \cdot d/\tan(\gamma)$, in particular at least $3 \cdot d/\tan(\gamma)$, wherein d is the VCSEL pitch (or center to center distance of the active areas of neighboring VCSELS) and $\gamma$ is the divergence angle of a VCSEL.

Similar to the illustration shown in FIG. 10H instead of several VCSELs, several groups of VCSELs or (groups of) VCSEL arrays may be provided. In this case, d may denote a pitch or separation between neighboring VCSEL arrays or groups of VCSEL arrays. A separation may refer to a center to center distance of one of neighboring VCSEL arrays, groups of VCSEL arrays or separate VCSEL chips. A separation between reflecting structures 27 arranged at different sides of the VCSELs may be an integer multiple of the pitch d. The light-guiding structure 27 may be implemented as a tube wherein a diameter of the tube is an integer multiple of a separation between neighboring VCSEL arrays or an integer multiple of a separation between neighboring groups of VCSEL arrays. A separation may again refer to a center to center distance. The tube may have e.g. a circular, rectangular or quadratic cross-section.

Figure 11:
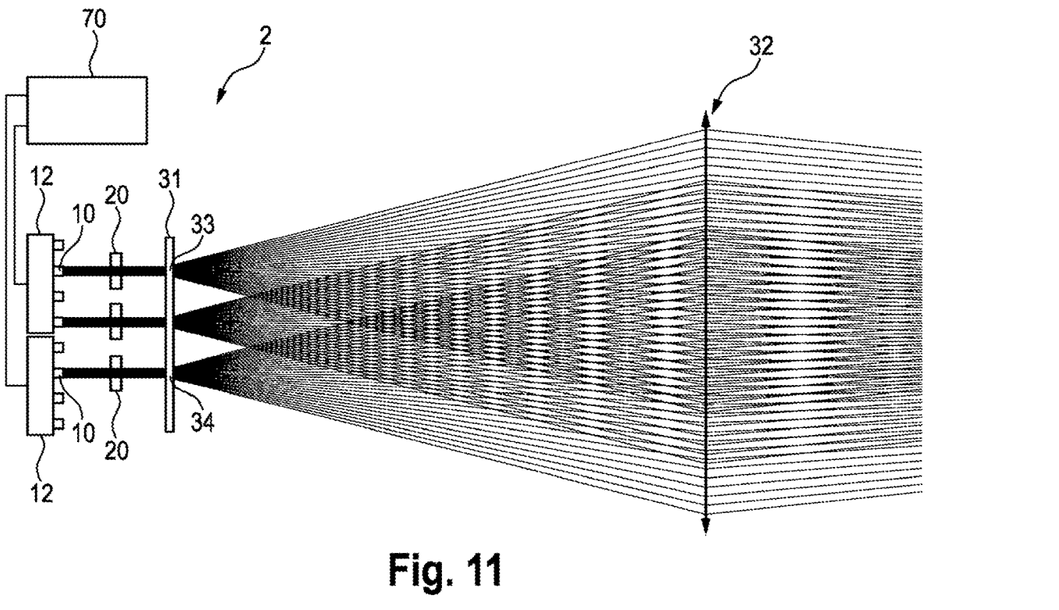
FIG. 11 shows a schematic diagram of a system according to an aspect of the present disclosure.

FIG. 11 shows an embodiment of a system adapted to generate a structured light pattern. The system comprises an apparatus as described above and further comprises a controller 70 adapted to control the VCSELs 11 of the VCSEL array 10. The controller 70 may be adapted to control individual VCSELs 11 or groups of VCSELs 11 of a VCSEL array 10. Furthermore, the controller may be adapted to control a plurality of VCSEL arrays 10.

As shown in FIG. 11 and also described with reference to FIG. 9, separate VCSEL arrays 10 may be provided on different substrates. In the example shown in FIG. 11, the pattern optics arrangement may again comprise a microlens array 31 in combination with an imaging lens 32. By controlling separate VCSELs or VCSEL arrays, different structured light patterns such as different spot patterns may be provided. It is also possible that the microlens array 31 may comprise different types of microlenses in different regions 33, 34 of the microlens array so as to provide an addressable spot pattern that is adapted to provide different patterns.

Figure 12:
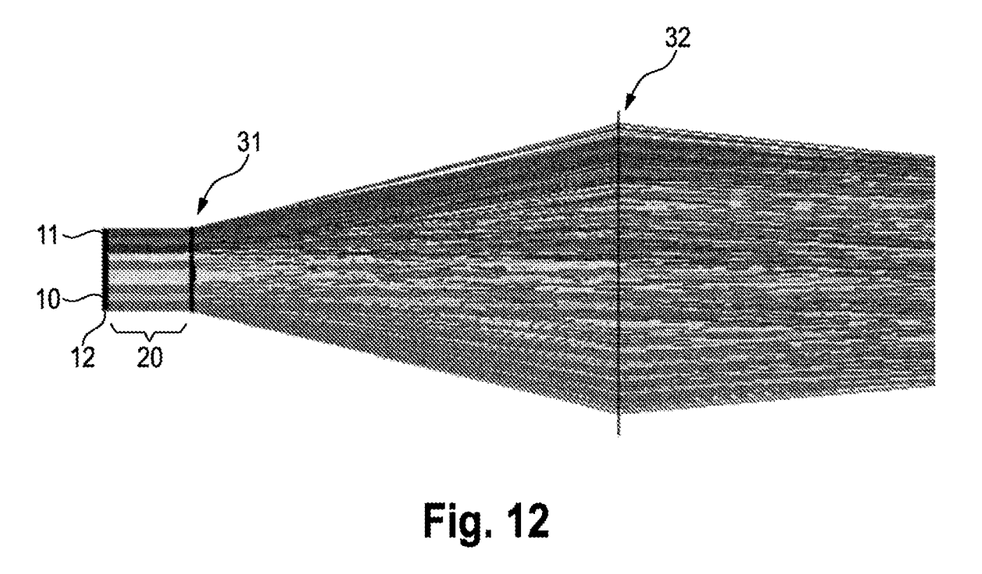
FIG. 12 shows a beam pattern having multiple activated VCSEL arrays.

FIG. 12 shows an optical simulation of multiple VCSEL arrays of the embodiment of FIG. 11 being activated.

Figure 13:
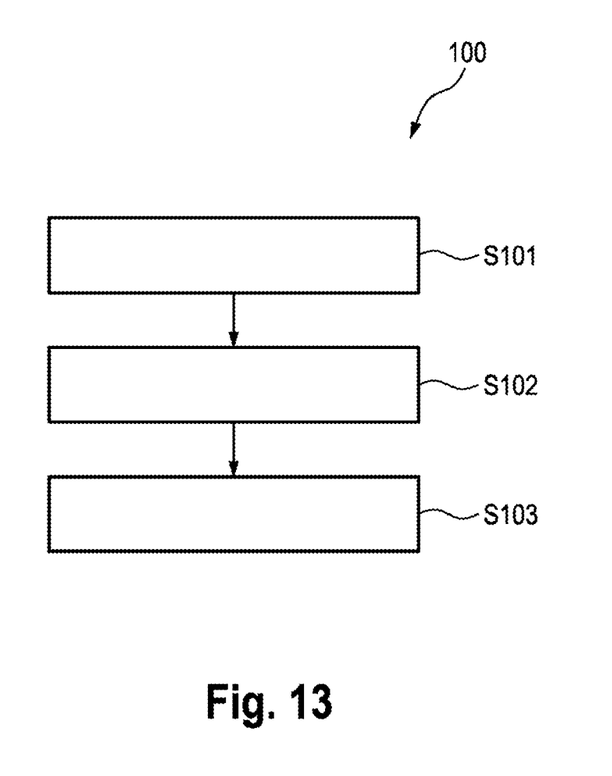
FIG. 13 shows a flowchart of a method according to an aspect of the present disclosure.

FIG. 13 shows a flowchart of a method according to an aspect of the present disclosure. In a first step S101, an array of vertical cavity surface-emitting lasers, VCSELs, is provided. In a second step S102 light emitted by a plurality of VCSELs of the array of VCSELs is homogenized in an intermediate plane to provide a homogeneous intensity distribution in said intermediate plane. In a third step S103, a structured light pattern is generated based on the homogeneous intensity distribution in said intermediate plane.

Similarly, a further method according to a further aspect of the present disclosure may be described with a flow chart analogous to FIG. 13. In a first step a first array 10 of vertical cavity surface emitting lasers 11, VCSELs, may be provided. In a second step a first homogenization optics arrangement associated with the first array of vertical cavity surface emitting lasers may be provided. In a third step a second array 10 of vertical cavity surface emitting lasers 11, VCSELs, may be provided. In a fourth step a second homogenization optics arrangement 20 associated with the second array of vertical cavity surface emitting lasers may be provided. The homogenization optics arrangements, each associated with a different VCSEL array, may be arranged such that their intensity distributions add up to a common homogeneous top-hat intensity distribution in the intermediate plane 60. In a fifth step, a structured light pattern 70 may be generated based on the common homogeneous intensity distribution in the intermediate plane.

In the following, some terms which are used throughout the application shall be shortly explained and defined: The term VCSEL as used herein refers to a Vertical Cavity Surface Emitting Laser. The VCSEL may be a top or bottom emitter. The disclosure may not be limited to a particular VCSEL. The VCSEL array may be a first VCSEL array. The homogenization optics arrangement may be a first homogenization optics arrangement. The pattern optics arrangement may be a first pattern optics arrangement. The intermediate plane may be parallel to a plane comprising the VCSELs of the VCSEL array. The homogenization optics arrangement may be adapted such that at least a portion of said intermediate plane is provided with light emitted by a plurality of VCSELs of the array of VCSELs. A homogeneous intensity distribution in an intermediate plane may refer to a portion or limited area having a homogeneous intensity distribution in said intermediate plane. For example, a portion of at least 30%, in particular of at least 40%, in particular of at least 60%, in particular of at least 80% of an area of the intermediate plane receiving light emitted by the plurality of VCSELs of the array of VCSELs. An area receiving light emitted by the plurality of VCSELs of the array of VCSELs may refer to an area receiving at least 10% of a peak intensity in said intermediate plane.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optoelectronic apparatus adapted to generate a structured light pattern, the optoelectronic apparatus comprising:
a first array of vertical cavity surface emitting lasers (VCSELs);
a first homogenization optics arrangement associated with the first array of VCSELs;
a second array of VCSELs;
a second homogenization optics arrangement associated with the second array of VCSELs,
wherein the first homogenization optics arrangement and the second homogenization optics arrangement, each associated with a different one of the first array of VCSELs or the second array of VCSELs, are arranged such that their intensity distributions add up to a common homogeneous top-hat intensity distribution in an intermediate plane; and
a pattern optics arrangement positioned downstream from the intermediate plane, the pattern optics arrangement comprising a first microlens array and configured to generate a structured light pattern based on the common homogeneous intensity distribution in the intermediate plane.

2. The apparatus as claimed in claim 1, wherein the first homogenization optics arrangement is configured such that a contribution of each individual VCSEL of the first array of VCSELs to an intensity at a surface element of the intermediate plane is less than 10% of an intensity of light emitted by the first array of VCSELs at the surface element.

3. The apparatus as claimed in claim 2, wherein the first homogenization optics arrangement is configured to provide a top-hat intensity distribution as the homogeneous intensity distribution in the intermediate plane,
wherein a full width at half maximum (FWHM) diameter of the top-hat intensity distribution is larger than a diameter of the first array of VCSELs.

4. The apparatus as claimed in claim 1, wherein the optoelectronic apparatus is configured to generate a dot pattern as the structured light pattern.

5. The apparatus as claimed in claim 1, wherein the optoelectronic apparatus is configured to generate a stripe pattern as the structured light pattern.

6. The apparatus as claimed in claim 1, wherein the first homogenization optics arrangement comprises a microlens array adapted to provide a homogeneous intensity distribution of light emitted by a plurality of VCSELs of the first array of VCSELs in the intermediate plane.

7. The apparatus as claimed in claim 6,
wherein at least a first microlens of the microlens array is configured to project a first magnified image of an active area of a corresponding first VCSEL of the first array of VCSELs onto the intermediate plane,
wherein at least a second microlens of the microlens array is configured to project a second magnified image of an active area of a corresponding second VCSEL of the first array of VCSELs onto the intermediate plane, and
wherein the first microlens and the second microlens are configured to project the first magnified image and the second magnified image in the intermediate plane so as to provide an aligned superposition of the first magnified image and the second magnified image in the image plane.

8. The apparatus as claimed in claim 1, wherein the first homogenization optics arrangement or the second homogenization optics arrangement comprises at least one of: (a) a fly-eye condenser; (b) a rod-homogenizer; or (c) a defocused lens arrangement configured to project a defocused image of a full VCSEL array in the intermediate plane.

9. The apparatus as claimed in claim 1,
wherein neighboring lenses of the first micro lens array have a pitch different than a pitch of neighboring VCSELs of the first array of VCSELs or the second array of VCSELs.

10. The apparatus as claimed in claim 1, wherein the first homogenization optics arrangement or the second homogenization optics arrangement and the pattern optics arrangement are a combined and integrally formed arrangement.

11. The apparatus as claimed in claim 1, wherein the structured light pattern generated by the pattern optics arrangement comprises a different number of rows or columns than a number of rows or columns of the first array of VCSELs or the second array of VCSELs.

12. The apparatus as claimed in claim 1,
wherein the first homogenization optics arrangement is configured to provide a first top-hat intensity distribution in the intermediate plane based on light emitted by a plurality of VCSELs of the first array of VCSELs;
wherein the second homogenization optics arrangement is configured to provide a second top-hat intensity distribution in the intermediate plane based on light emitted by a plurality of VCSELs of the second array of VCSELs, and
wherein the first top-hat intensity distribution and the second top-hat intensity distribution are adjacent to each other and together form a combined top-hat intensity distribution providing a homogeneous intensity distribution in the intermediate plane.

13. The apparatus as claimed in claim 1, the apparatus further comprising a second pattern optics arrangement;
wherein the pattern optics arrangement is configured to generate a first structured light pattern based on a first portion of the common homogeneous intensity distribution in the intermediate plane, and
wherein the second pattern optics arrangement is configured to generate a second structured light pattern based on a second portion of the common homogeneous intensity distribution in the intermediate plane.

14. The apparatus as claimed in claim 13,
wherein the pattern optics arrangement and the second pattern optics arrangement are configured such that the structured light pattern and the second structured light pattern are directed at different regions, and
wherein a separation between the structured light pattern and the second structured light pattern does not exceed a separation between neighboring structures of the structured light pattern.

15. A system adapted to generate a structured light pattern, the system comprising:
the apparatus as claimed in claim 1; and
a controller adapted to control VCSELs of the first array of VCSELs or the second array of VCSELs.

16. A method for generating a structured light pattern, the method comprising: providing a first array of vertical cavity surface emitting lasers (VCSELs); providing a first homogenization optics arrangement associated with the first array of VCSELs; providing a second array of VCSELs; providing a second homogenization optics arrangement associated with the second array of VCSELs; operating the first array of VCSELs and the second array of VCSELs to generate a common homogeneous intensity distribution in an intermediate plane through the first homogenization optics arrangement and the second homogenization optics arrangement; providing a pattern optics arrangement positioned downstream from the intermediate plane; and generating a structured light pattern based on the common homogeneous intensity distribution in the intermediate plane through the pattern optics arrangement.

17. The apparatus as claimed in claim 10, wherein the first homogenization optics arrangement, the second homogenization optics arrangement, and the pattern optics arrangement are an injection-molded integrally formed arrangement.

* * * * *